Jan. 15, 1935.   L. C. SMITH   1,987,948
REFRIGERANT CONTROL DEVICE
Filed Aug. 1, 1933
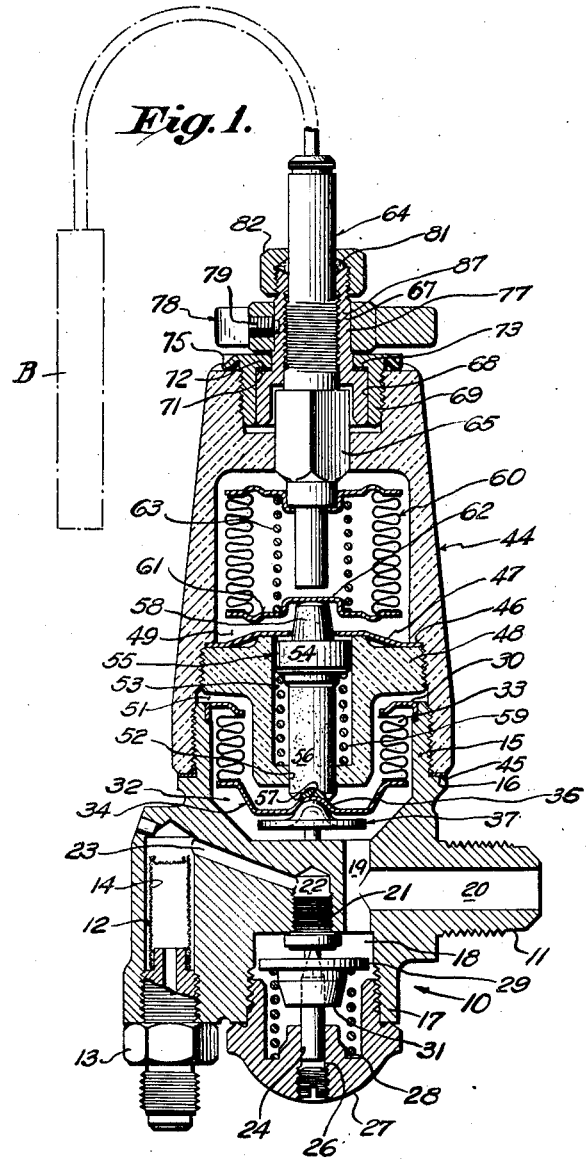
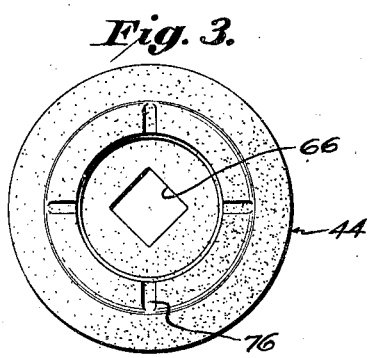
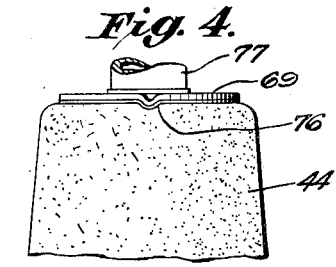
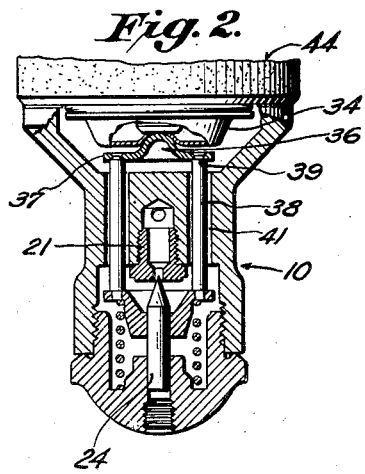
Inventor
Lawrence C. Smith
Albert R Henry
Attorney Patented Jan. 15, 1935

1,987,948

UNITED STATES PATENT OFFICE 1,987,948

REFRIGERANT CONTROL DEVICE

Lawrence C. Smith, Kenmore, N. Y., assignor to Fedders Manufacturing Company, Inc., Buffalo, N. Y.

Application August 1, 1933, Serial No. 683,146

4 Claims. (Cl. 236—92)

This invention relates to refrigerant control devices for refrigeration systems of the direct expansion type.

The invention is particularly directed to an improved thermostatic expansion valve including a novel valve actuating structure and a simplified means for adjustment thereof. The invention also resides in various safety devices for preventing the introduction of moisture within the device and for insulating the power bellows from the low temperatures of the expanded refrigerant.

Other features of the invention are more specifically set forth in the accompanying specification and drawing, wherein:

Fig. 1 is a vertical section through the thermostatic expansion valve;

Fig. 2 is a partial section on the line 2—2 of Fig. 1;

Fig. 3 is a plan of the housing before assembly;

Fig. 4 is a side elevation of the upper portion of the device with the adjusting wheel removed.

In accordance with the present invention, the device is provided with a mounting body 10 having formed thereon a horizontal stud 11 for connection with the "low" or evaporator side of a refrigeration system, and a threaded vertical passage 12 for receiving an input fitting 13 which may be connected to the "high" or condenser side of the system. A cylindrical fine mesh screen 14 is secured to the fitting 13 to prevent the entry of foreign particles into the body 10. The body 10 is also formed with a threaded vertical boss 15 terminating in a shoulder 16 providing a mounting means for the thermostatic unit, hereinafter described, and a lower boss 17 formed with a vertical valve chamber 18.

A valve seat member 21 is inserted in the upper wall of the chamber 18 and it is formed with an axial passage 22 which communicates with the input passage 12 through a drilled connecting passage 23. The chamber 18 also communicates with the "low" side of the system through a drilled hole 19 leading into a horizontal passage 20 formed in the stud 11. A needle valve 24 is adapted to control the communication between the "high" or "low" sides of the system by movement relative to its seating member 21. The valve 24 is slidably mounted in a vertical bearing 26 of a fitting 27 which is threaded into the open end of the chamber 18, and it is urged toward the seat member 21 by a valve spring 28 which engages under the flange 29 of a thrust member 31 secured to the valve.

The upper boss 15 is formed with an enlarged depression providing a bellows chamber 32 which receives a sealing bellows 33. The upper extremity of the bellows is provided with a flanged ring 30 which is soldered to the end of the chamber wall. The lower extremity of the bellows is secured to a cap member 34 which completes the enclosure of the chamber 32, and it is formed with a central depression 35 which provides a socket for receiving a bead 36 formed on a yoke member 37. The yoke member is utilized as a mounting for a pair of spaced rods 38 which are accurately shouldered as indicated by the numeral 39 and riveted at their upper extremities to the member 37, whence they project downward through clearance holes 41 in the body 10 to the thrust member 31, which contains spaced holes for receiving the shouldered portions thereof. This provides a mechanical connection between the bellows 33 and the valve 24, wherein when the bellows moves downward the rods are actuated to move the valve from its seat.

As thus far described, the device may be utilized as an ordinary expansion valve, wherein pressure variations of the fluid in the chamber 32 would be reflected in the movement of the bellows 33 to actuate the valve 24 in the manner well known in the art. Many standard thermostatic attachments may be applied to this device to provide thermostatic control, but it is preferred that the control hereinafter described be utilized to obtain the best practical results.

The thermostatic unit comprises a housing 44, which is internally threaded so that it may be screwed onto the boss 15 of the body 10 to engage a gasket 45 on the shoulder 16 thereof, thus sealing the interior of the housing from the outside atmosphere. The housing is internally shouldered as indicated by the numeral 46 for receiving a metallic disc 47 and it is threaded therebeneath for receiving a wall member 48 which divides the space within the assembled housing and body into a power bellows chamber 49 and a sealing bellows chamber 51.

The wall member 48 is formed with a bore 52 and a counterbore 53, the latter slidably receiving the head 54 of a connecting rod 55, the stem 56 of which extends through the bore 52 for engagement with the depressed portion 35 of the sealing bellows 33. The extremity of the stem 56 is countersunk as indicated by the numeral 57 so that it engages over the rounded portion 35 and thus has a centering effect on the bellows 33. The upper end of the rod 55 is formed with an extension 58 which protrudes through a hole in the disc 47 for engagement with the power bellows hereinafter described. A spring 59 is mounted within the counterbore 53 for engagement with the head 54 so that the rod 55 is continually urged upward.

The thermostatic or power bellows 60 is positioned within the chamber 49 and it is provided with a lower cap 61 having a depression 62 for receiving the rod extension 58. A spring 63 is mounted within the bellows 60 and it tends to separate the caps thereof. The interior of the bellows communicates with the usual bulb "B" through a hollow stem 64 secured thereto. The stem 64 is formed with a squared portion 65 which is slidably received in a cooperating square hole 66 formed in the housing 44 in order to prevent turning of the unit during adjustment. The stem is threaded above the squared portion 65 for engagement with the thread of an adjusting nut 67, which in turn is rotatably mounted within the counterbore 68 of the mounting member 69. The nut is shouldered at 71 and a gasket 72 is interposed between it and a shoulder 73 on the member 69 to provide an air-tight joint. It will be observed that the member 69 is screwed into position on the housing 44 and is staked against removal by deforming its flange portion 75 for entry into spaced notches 76 formed in the top of the housing 44.

The shank 77 of the adjusting nut 67 which protrudes from the mounting member 69 receives an adjusting wheel 78, which is secured by a set screw 79, and the extremity of the shank 77 is formed to receive a packing 81 and a packing nut 82 to prevent air entry between the nut 67 and stem 64.

In the operation of the device, the bulb "B" which is mounted in intimate thermal contact with the evaporator of the system, is filled with a fluid which expands or contracts in response to temperature variations and causes a corresponding expansion or contraction of the power bellows 60 Upon expansion, the bellows engages the extension 58 of the rod 55 and moves the rod out of engagement with the disc 47 and downward to actuate the sealing bellows 33 and yoke member 37. The rods 38, being carried by the yoke member, are forced downward to open the valve 24 against the resistance of its spring 28, as shown in Figs. 1 and 2. Upon contraction of the bellows the above described action is reversed, and the forces on the valve 24 are released to permit the spring 28 to restore it to its seat.

The valve 24 may be set to open under any temperature condition within a rather wide range by adjustment of the power bellows spring 63. This spring may be compressed or released by turning the adjusting wheel 78 so that it may be loaded to counteract the force of the central spring 59. The provision of the latter spring permits extremely accurate adjustment of the power bellows, since its opposition to the spring 63 is constant and unaffected by the pressure conditions in the underlying structure.

During operation of the device the expansion of the refrigerant in the valve chamber 18 and sealing bellows chamber 32 causes the adjacent metallic parts to be reduced to freezing temperatures, which if conveyed to the power bellows would cause contraction of the fluid therein, resulting in a possible false reaction. To prevent this condition, the housing 44, wall member 48, and connecting rod 55 are formed of materials having a low heat conductivity. Phenolic resin compositions have proved the most practical at present, but other materials such as porcelain may be used. This arrangement prevents a rapid heat exchange between the body 10 and the power bellows 60.

The common air pocket in the chambers 49 and 51 offers the remaining medium of heat exchange between the bellows 60 and 33, and inasmuch as the connection between the chambers is through the small clearance areas in the wall member 48, the air flow is throttled and simultaneously subjected to exposure to the relatively warm surfaces of the member 48.

Under all conditions the previously mentioned air pocket is completely isolated from the outside atmosphere through the provision of the various gaskets in the housing and the packing 81 on the adjusting nut 82. This obviates the usual failure of devices of this nature by the introduction of moisture-laden air into the pocket, resulting in the eventual snow-blocking of the power bellows.

The device is particularly designed for accessibility to the various units for assembly or replacement. For example, to replace the thermostatic bellows 60 the housing 44 is unscrewed from the body 10, thus exposing the wall member 48, which, together with the disc 47, is easily removed from the open end of the housing. The packing nut 82 is then disengaged and the adjusting wheel 78 turned until the threaded section of the adjusting nut shank is disengaged from the thread on the stem 64, whereupon the power bellows 60 may be bodily removed through the open end of the housing 44. It will be noted that the diameter of the bulb "B" is such that it may also be withdrawn through the adjusting structure.

I claim:

1. In a refrigerant control device, a body, a valve therein, a sealing bellows mounted in the body and operable to actuate said valve, a thermostatic bellows responsive to temperature conditions, a housing secured to the body and enclosing both of said bellows, a wall in the housing thermally separating the bellows, said wall being formed with a bore and a counterbore, a rod extending through the wall and connecting the bellows, said rod being formed with a head slidably mounted in the counterbore of the wall and a stem extending through the bore thereof, a spring mounted in the counterbore of the body and engaging the head of said rod to urge it towards said thermostatic bellows, and adjustable means on said housing for compressing said bellows against the resistance of said spring pressed rod.

2. In a refrigerant control device, a body, a valve therein, a sealing bellows mounted in the body and operable to actuate said valve, a thermostatic bellows responsive to temperature conditions, a housing secured to the body and enclosing both of said bellows, a rod connecting the sealing bellows for operation by the thermostatic bellows, a spring within said thermostatic bellows tending to open the same, a stem on said thermostatic bellows extending through the housing, a mounting member secured to the housing, a nut rotatably mounted within the mounting member and extending through the housing, said nut having an interior threaded portion receiving a cooperating threaded portion of the stem and being operable to move said stem and compress the bellows and spring therein against said rod.

3. In a refrigerant control device, a body formed with spaced valve and bellows chambers, a seat in the valve chamber, a valve for the seat, a sealing bellows mounted in the bellows chamber, means connecting the valve for operation by the bellows comprising a yoke engaging said bellows, a plurality of rods secured to the yoke, said body being formed with a plurality of holes connecting the chambers, said rods extending therethrough, a flanged member secured to the valve and formed to receive removably the ends of said rods, and a spring engaging said flanged member to retain the valve in seated position.

4. In a refrigerant control device, a body formed with spaced valve and bellows chambers, a seat in the valve chamber, a valve for the seat, means in the valve chamber for guiding the valve for axial movement, a sealing bellows mounted in the bellows chamber, means connecting the valve for operation by the bellows comprising a yoke engaging said bellows, said yoke and bellows being formed with complementary engaging portions, a plurality of rods secured to the yoke, said body being formed with a plurality of holes connecting the chambers, said rods extending therethrough, a flanged member secured to the valve and formed to receive removably the ends of the rods, and a spring engaging said flanged member to retain the valve in seated position.

LAWRENCE C. SMITH.